US012592597B2

(12) United States Patent
Fatemi et al.

(10) Patent No.: US 12,592,597 B2
(45) Date of Patent: Mar. 31, 2026

(54) SELECTIVE PERMEABILITY ROTOR STRUCTURE FOR INTERIOR PERMANENT MAGNET MACHINE

(71) Applicant: GM GLOBAL TECHNOLOGY OPERATIONS LLC, Detroit, MI (US)

(72) Inventors: Alireza Fatemi, Canton, MI (US); Eric C. Clough, Santa Monica, CA (US); Thomas W. Nehl, Shelby Township, MI (US); Wesley G. Zanardelli, Rochester, MI (US); David A. Smith, Newbury Park, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 296 days.

(21) Appl. No.: 18/509,914

(22) Filed: Nov. 15, 2023

(65) Prior Publication Data

US 2025/0158465 A1 May 15, 2025

(51) Int. Cl.
*H02K 1/28* (2006.01)
*B60K 6/26* (2007.10)
*H02K 1/276* (2022.01)
*H02K 21/14* (2006.01)

(52) U.S. Cl.
CPC .............. *H02K 1/28* (2013.01); *H02K 1/276* (2013.01); *H02K 21/14* (2013.01); *B60K 6/26* (2013.01); *B60Y 2200/92* (2013.01)

(58) Field of Classification Search
CPC ........ B60K 6/26; H02K 1/276; H02K 1/2766; H02K 1/28; H02K 21/14; B60Y 2200/92
See application file for complete search history.

(56) References Cited

U.S. PATENT DOCUMENTS

| | | | | |
|---|---|---|---|---|
| 2021/0344262 A1* | 11/2021 | Gehrke | ................ | H02K 15/023 |
| 2023/0238869 A1* | 7/2023 | Akiyama | ............. | H02K 41/033 |
| | | | | 310/12.24 |
| 2024/0014702 A1* | 1/2024 | Cesa | ...................... | H02K 21/14 |
| 2025/0132619 A1* | 4/2025 | Honma | ................ | H02K 1/2766 |

FOREIGN PATENT DOCUMENTS

| | | |
|---|---|---|
| DE | 1811585 A1 | 7/1969 |
| DE | 102020126339 A1 | 4/2022 |
| DE | 102020216254 A1 | 6/2022 |
| JP | 11069678 A | 9/1999 |
| JP | 2014093803 A | 5/2014 |

\* cited by examiner

*Primary Examiner* — Christopher M Koehler
*Assistant Examiner* — Ethan Nguyen Vo
(74) *Attorney, Agent, or Firm* — Quinn IP Law

(57) ABSTRACT

A radial flux electric motor includes a stator having a radially inner stator surface and stator windings arranged thereon. The motor also includes a rotor mounted inside the stator and configured to rotate relative thereto about an axis. The rotor has a rotor core constructed from a ferromagnetic material having relatively high magnetic permeability and defined by a rotor outer surface establishing an airgap between the rotor and the stator. The rotor also has a plurality of magnetic poles set in the rotor core and configured to generate magnetic flux. The rotor additionally has inserts constructed from a material having relatively low magnetic permeability in at least one geometric direction. Each insert is mechanically fixed to the rotor core to thereby control magnetic flux distribution and minimize flux leakage inside the rotor.

20 Claims, 4 Drawing Sheets

SELECTIVE PERMEABILITY ROTOR STRUCTURE FOR INTERIOR PERMANENT MAGNET MACHINE

INTRODUCTION

The disclosure relates to a selective permeability rotor structure for an interior permanent magnet machine.

An electric motor is a machine that converts electric energy into mechanical energy. Electric motors may be configured as an alternating current (AC) or a direct current (DC) type. An electric motor's operation is based on an electromagnetic interaction between permanent magnets and the magnetic field created by the machine's selectively energized coils. Electric motors are generally classified into two categories based on the direction of the magnetic field-axial flux motors and radial flux motors.

An interior permanent magnet (IPM) electric motor is an AC synchronous brushless machine with permanent magnets embedded in the rotor core. IPM machines are generally characterized by a favorable ratio of output torque versus the motor's physical size, as well as reduced input voltage. Electric motor torque is commonly generated by the magnetic flux linkage between the field of the rotor permanent magnets and the electro-magnetic field of the stator. IPM motors may augment such permanent magnet torque with reluctance torque which permits use of thinner rotor magnets.

SUMMARY

A radial flux electric motor includes a stator having a radially inner stator surface and stator windings arranged thereon. The motor also includes a rotor mounted inside the stator and configured to rotate relative thereto about an axis. The rotor has a rotor core constructed from a ferromagnetic material having relatively high magnetic permeability and defined by a rotor outer surface establishing an airgap between the rotor and the stator. The rotor also has a plurality of magnetic poles set in the rotor core and configured to generate magnetic flux. The rotor additionally has inserts constructed from a paramagnetic material having relatively low magnetic permeability in at least one geometric direction. Each insert is mechanically fixed (e.g., welded) to the rotor core to thereby control magnetic flux distribution and minimize or flux leakage inside the rotor.

Each insert may be arranged on the rotor outer surface, either between adjacent magnetic poles or across from individual magnetic poles.

Each insert may have either a hollow body or a solid body construction.

The ratio of the relatively high magnetic permeability of the ferromagnetic material to the relatively low magnetic permeability of the insert material may be greater than 100 to 1, and further may be greater than 10,000 to 1.

Each magnetic pole may include at least one rotor pocket having at least one permanent magnet embedded therein and configured to generate the magnetic flux. Each rotor pocket may have at least a portion thereof arranged proximate to at least one of the inserts.

Each insert may be configured to define a structural bridge extending from at least one of the rotor pockets to the rotor outer surface. Such an insert-defined structural bridge may serve to reinforce the rotor core and minimize leakage of the magnetic flux inside the rotor.

The ferromagnetic material may be ferrous steel and the insert material may be paramagnetic, such as austenitic steel.

Alternatively, the insert material may be grain-oriented steel. In such an embodiment, orientation of the grain may be perpendicular to direction of leakage of the magnetic flux between the rotor and stator and parallel to direction of linkage of the magnetic flux between adjacent magnetic poles.

Each insert may be configured to inhibit closure of a magnetic flux loop inside the rotor.

The rotor core may include multiple adjacent rotor laminations arranged along the rotational axis. For example, adjacent rotor laminations may be constrained or fixed together by an interference fit with the rotor core or by being pressed together via rotor end plates. In such an embodiment, the inserts of adjacent rotor laminations may be arranged out of phase relative to one another.

The adjacent rotor laminations may be electrically isolated from one another via a dielectric element, such as a dielectric thin strip of material or coating.

Each insert may define a radial magnetic permeability and a circumferential magnetic permeability relative to the rotational axis. In such an embodiment, the magnitude of the radial magnetic permeability gradient may be different from the magnitude of the circumferential magnetic permeability gradient.

The radial flux electric motor may be an interior permanent magnet (IPM) or a surface-mounted permanent magnet (SPM) synchronous machine.

A motor vehicle having such a radial flux electric motor as described above is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
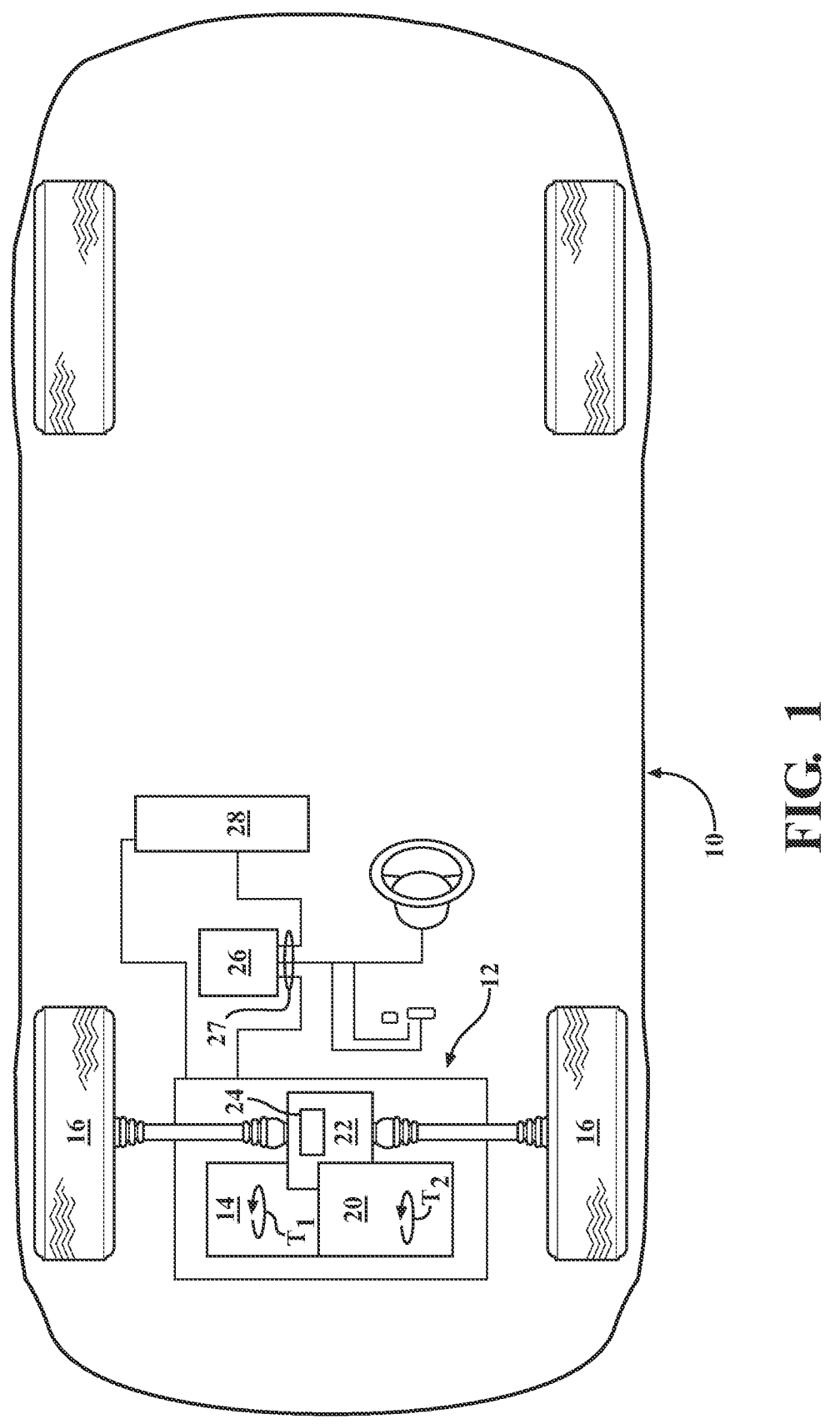
FIG. 1 is a schematic illustration of a motor vehicle having a powertrain employing a radial flux electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to FIG. 1, a motor vehicle 10 having a powertrain 12 is depicted. The motor vehicle 10 may include, but not be limited to, a commercial vehicle, industrial vehicle, passenger vehicle, aircraft, watercraft, train or the like. It is also contemplated that the motor vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque $T_1$ (shown in FIG. 1) for propulsion of the motor vehicle 10 via driven wheels 16 relative to a road surface. The motor-generator 14 may be configured as a radial flux electric motor, where the magnetic flux is generated perpendicular to the motor's axis of rotation and the airgap between the machine's rotor and stator is arranged concentrically with the rotational axis.

As shown in FIG. 1, the powertrain 12 may also include a second power-source 20, such as an internal combustion engine configured to generate a second power-source torque $T_2$. The power-sources 14 and 20 may act in concert to power the motor vehicle 10 and be operatively connected to a transmission assembly 22. The transmission assembly 22 may be configured to transmit first and/or second power-source torques $T_1$, $T_2$ to a final drive unit 24, which in turn may be connected to the driven wheels 16. The first power-source 14, which for the remainder of the present disclosure will be referred to as a motor-generator or electric motor, may, for example, be mounted to the second power-source 20, mounted to (or incorporated into) the transmission assembly 22, mounted to the final drive unit 24, or be a stand-alone assembly mounted to the structure of the vehicle 10. As shown, the motor vehicle 10 additionally includes a programmable electronic controller 26 configured to communicate via a high-voltage BUS 27 and control the powertrain 12 to generate a predetermined amount of power-source torque (sum of $T_1$ and $T_2$), and various other vehicle systems. Motor vehicle 10 additionally includes an energy storage system 28, such as one or more batteries, configured to generate and store electrical energy for powering the power-sources 14 and 20.

Figure 2:
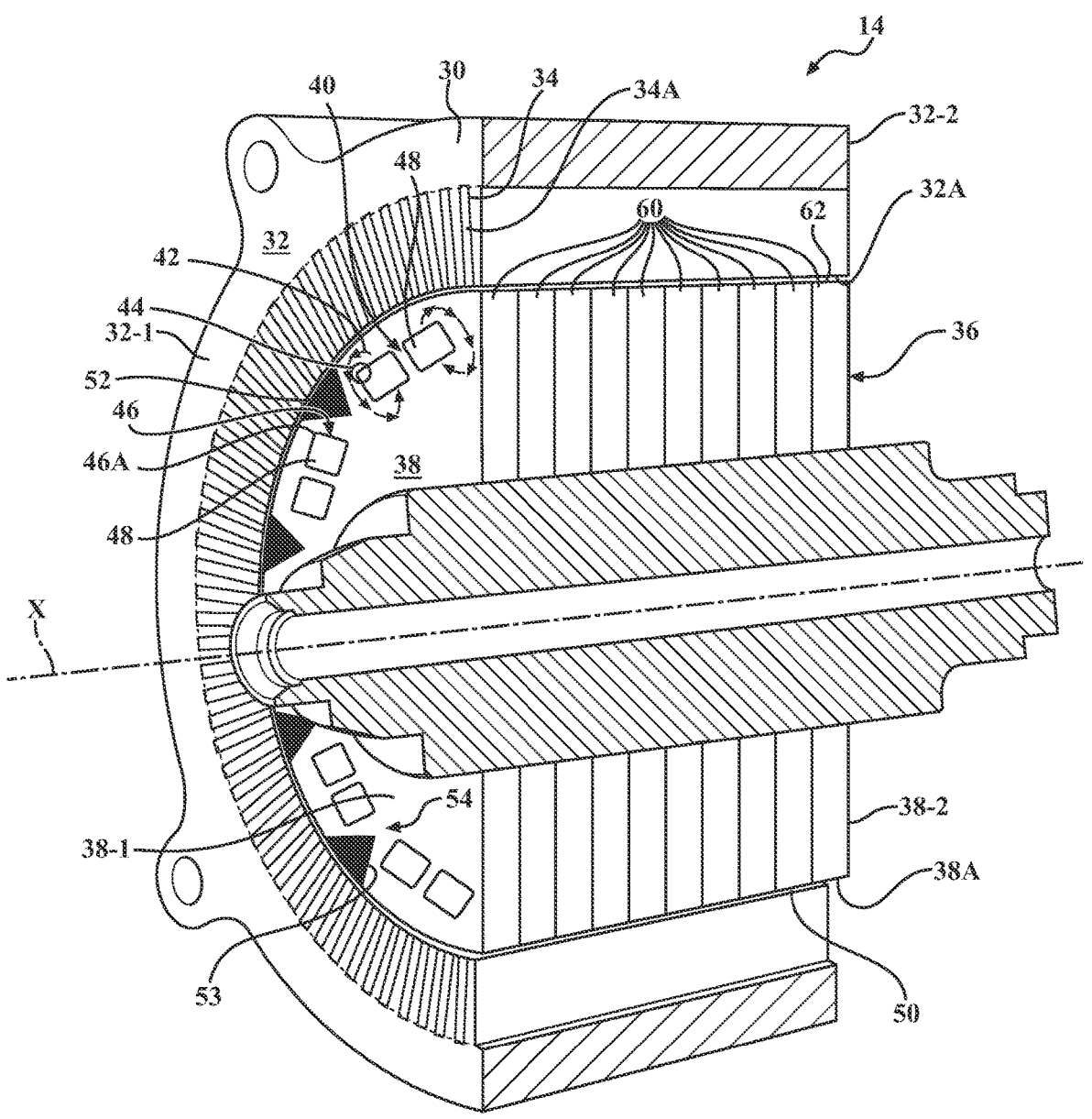
FIG. 2 is a schematic close-up partial cut-away perspective view of the radial flux electric motor-generator shown in FIG. 1, depicting a rotor having a ferromagnetic core and paramagnetic material inserts, wherein the rotor is constructed from multiple adjacent rotor laminations, according to the disclosure.
Figure 3:
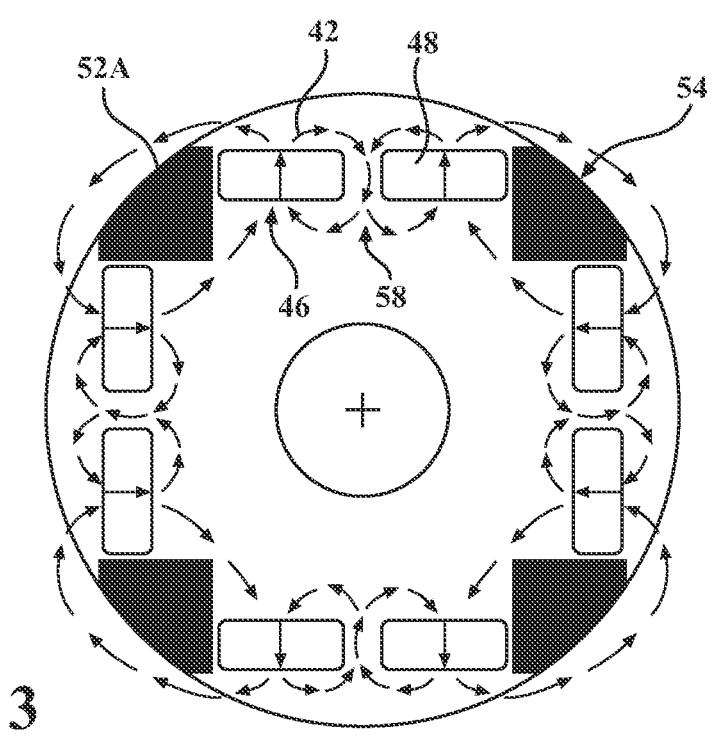
FIG. 3 is a schematic front view of an embodiment of the rotor shown in FIG. 2 having solid paramagnetic material inserts, according to an embodiment of the disclosure.
Figure 4:
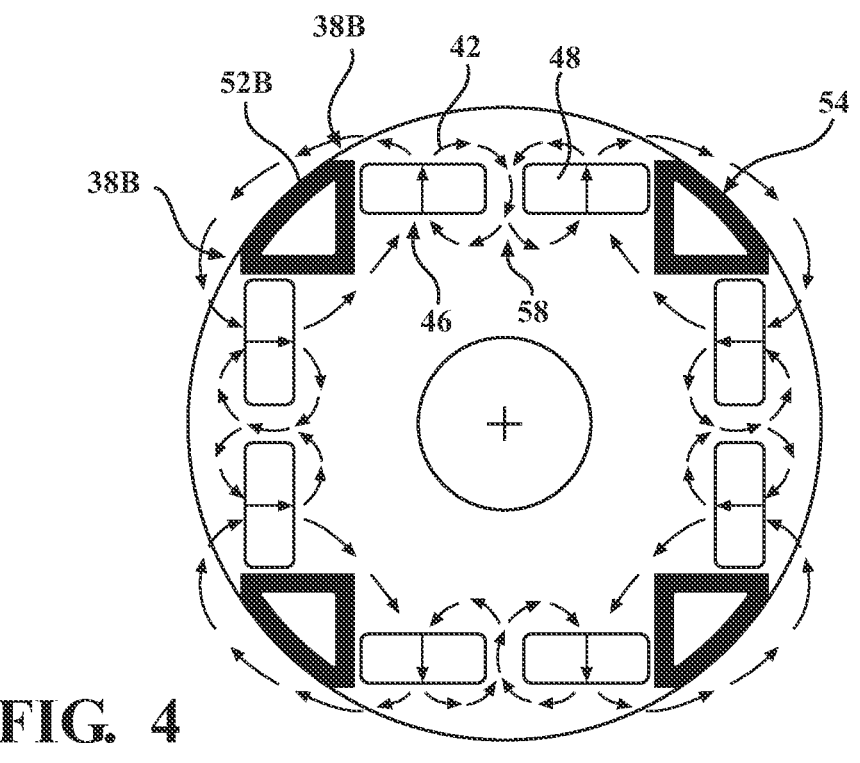
FIG. 4 is a schematic front view of an embodiment of the rotor shown in FIG. 2 having hollow paramagnetic material inserts, according to an embodiment of the disclosure.

FIG. 2 illustrates a general cross-section of the radial flux motor-generator 14. As shown, the motor-generator 14 includes a rotationally fixed stator 30 having a generally cylindrical core 32 and winding slots 34. As shown for example in FIG. 3B, the stator core 32 also has a radially inner stator core surface 32A. The motor-generator 14 also includes a rotor 36 arranged on a shaft defining a rotational axis X and thereby mounted for rotation inside the stator 30. The stator 30 may include multiphase AC windings or poles 34A arranged within the winding slots 34, wherein the windings receive multiphase AC from a power inverter to establish a rotating magnetic field exerting torque upon the rotor 36. The stator windings 34A are generally contained within the winding slots 34 with end turns of the windings extending beyond the limits of the cylindrical core 32 at axially opposite stator ends-a first end 32-1 and a second end 32-1.

The rotor 36 has a ferromagnetic rotor core 38. The rotor core 38 has axially opposite rotor core ends—a first end 38-1 and a second end 38-2—and is defined by a radially outer rotor surface 38A. The rotor core 38 may be constructed from a relatively soft magnetic material, such as laminated silicon or ferrous steel. The rotor 36 also includes a plurality of magnetic poles 40, each configured to generate magnetic flux 42. Specifically, the stacked rotor laminations may include voids forming interior pockets 46 with one or more permanent magnets 48 disposed or embedded therein, collectively defining the magnetic poles 40. The radial flux electric motor 14 may be an interior permanent magnet (IPM) or a surface-mounted permanent magnet (SPM) synchronous machine, as understood by those skilled in the art.

Prior art motor-generator construction generally includes substantially homogenous ferromagnetic rotor core structure facilitating magnetic flux 42 leakage paths in radially outer regions of the respective rotor core. For example, in such an existing rotor structure a bridge area between an edge or corner portion of an interior pocket and the rotor outer surface may define or act as a flux leakage zone, permitting magnetic flux of the rotor to cross into the stator. As will be described in detail below, the present motor-generator 14 has a selective permeability structure of the rotor 36. The selective permeability structure of the rotor 36 is specifically designed to minimize or suppress leakage of magnetic flux 42 in the bridge areas of the rotor core 38.

The rotor core 38 has a relatively high magnetic permeability and its rotor outer surface 38A establishes an airgap 50 (shown in FIG. 2) between the rotor 36 and the stator 30. As shown in FIGS. 2-5, the rotor 36 additionally includes a plurality of inserts 52 constructed from a material having relatively low magnetic permeability in at least one geometric direction. For example, inserts 52 may be constructed from a paramagnetic material, such as austenitic steel. Each insert 52 may be arranged on or just inside or beneath the rotor outer surface 38A, either between adjacent magnetic poles 40 (shown in FIGS. 2-5) or across from individual magnetic poles, such as inside the interior pockets 46 next to the respective permanent magnets 48 disposed therein (shown in FIG. 6). Each insert 52 is mechanically fixed to the rotor core 38. Accordingly, the number of inserts 52 in the rotor 36 assembly is equal to at least the number of magnetic poles 40. Due to their low magnetic permeability, the inserts 52 act to redirect magnetic flux 42 of the magnetic poles 40, control flux distribution across the rotor 36, and generally suppress eddy current losses in the motor-generator 14. Specifically, each insert 52 is intended to minimize or suppress leakage of magnetic flux 42 inside the rotor core 38 and facilitate closure of magnetic flux loop 42A linkage of magnetic flux loop with the corresponding magnetic poles 34A on the stator 30.

The inserts 52 may be laser or MIG welded to the rotor core 38. The corresponding welds 53 retaining the inserts 52 may be applied along planar faces of the rotor core 38 and along the outer surface 38A to ensure permanent and reliable connection between the inserts and the rotor core. The rotor core 38 may also include sections 38B configured to radially capture and retain individual inserts 52 within the respective laminations. As may be seen in FIGS. 3-5, at least one insert 52 is arranged to the left and at least one insert is arranged to the right of each magnetic pole 40. Such integration of the relatively low magnetic permeability inserts 52 into the rotor core 38 is intended to generate a net-formed rotor structure, removing the need for additional machining and/or assembly of the rotor 36.

Each insert 52 may have either a solid body 52A (shown in FIG. 3) or a hollow body 52B (shown in FIG. 4) construction, wherein the solid inserts may provide increased structural support, while hollow inserts may reduce mass and material. Although not shown, the inserts 52 may be divided into individual insert segments in the axial direction (along the rotational axis X), for example, arranged in discrete rotor laminations. In such an embodiment, dielectric separators may be installed between individual insert segments to minimize the impact of induced eddy currents. Each insert 52 may have relative magnetic permeability of less than 10 and further less than 1.2. The ratio of relatively high magnetic permeability of the rotor core 38 ferromagnetic material to the relatively low magnetic permeability of the inserts 52 may be greater than 100 to 1, and further may be greater than 10,000 to 1.

Each rotor pocket 46 has at least a portion 46A thereof arranged proximate to at least one of the inserts 52. Each insert 52 may be configured to define a structural bridge 54 extending from at least one of the rotor pockets 46 to the rotor outer surface 38A that maintains the corresponding magnetic pole 40 within the rotor core 38. Although each of the inserts 52 is shown as spanning two neighboring structural bridges 54, an individual insert for each respective bridge is also envisioned. Thus positioned, the corresponding insert 52 acts to reinforce the rotor core 38 in addition to minimizing leakage of the magnetic flux 42 inside the rotor 36.

Figures 5, 6:
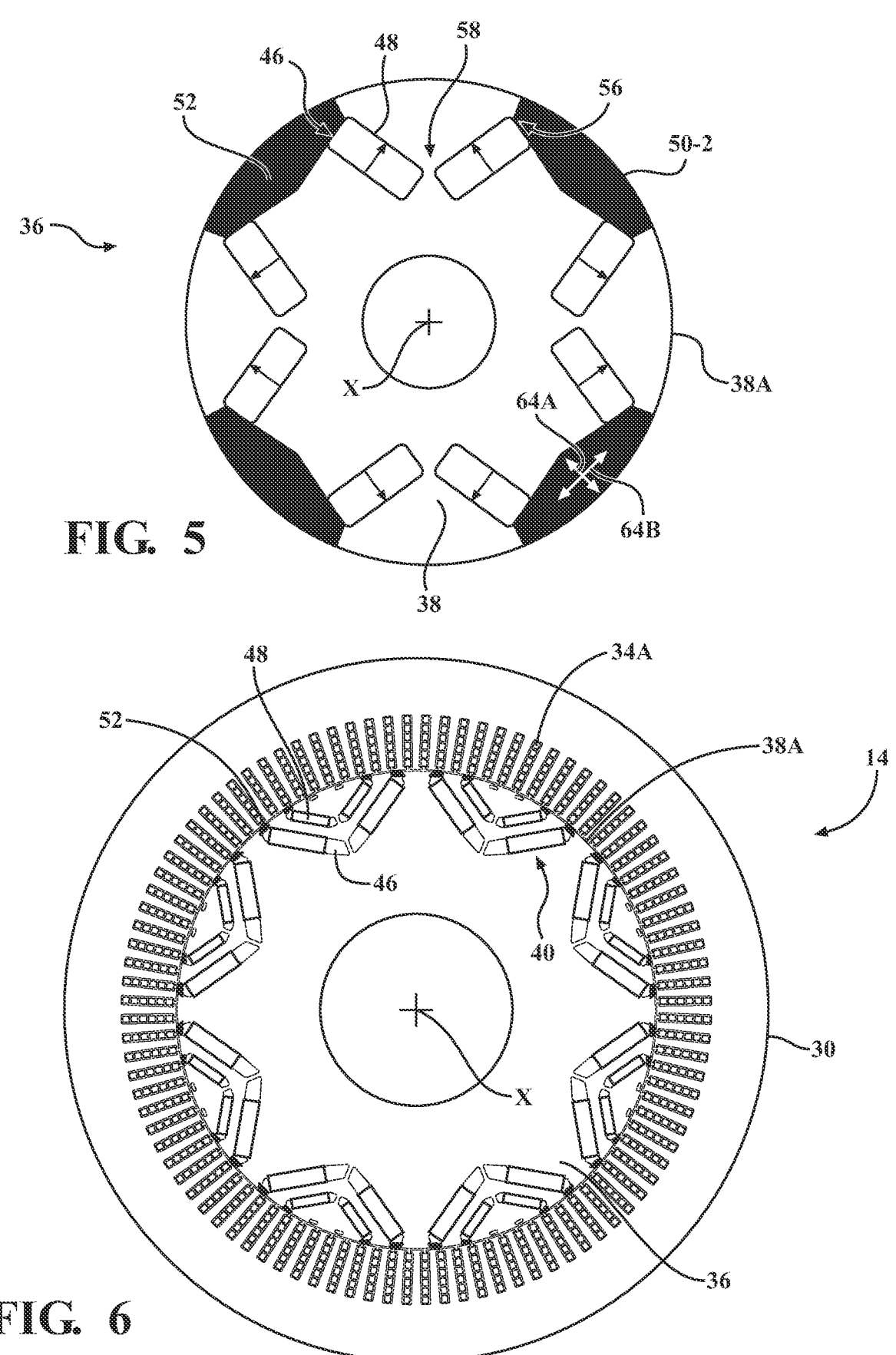
FIG. 5 is a schematic front view of another embodiment of the rotor shown in FIG. 2 having V-shaped magnetic poles with rotor pockets having permanent magnets embedded therein and paramagnetic material inserts arranged to retain the magnets, according to an embodiment of the disclosure.
FIG. 6 is a schematic front view of another embodiment of the rotor shown in FIG. 2 having multiple layers of permanent magnets and paramagnetic material inserts arranged in rotor interior pockets, according to an embodiment of the disclosure.

As shown in FIG. 2, individual magnetic poles 40 may include neighboring permanent magnets 48 arranged in respective neighboring rotor pockets 46. In such a structure, the rotor core 38 may include a structural web 58 positioned between the subject neighboring rotor pockets. A specific arrangement of the permanent magnets 48 may have a general "V" shape, with the structural web 58 positioned at the point of the "V", as shown in FIG. 5. Adjacent inserts 52 may be arranged to align with the small edge or a corner of corresponding proximately positioned permanent magnets 48 forming the V arrangement, thereby retaining the subject permanent magnets within the rotor core 38. Thus positioned, the inserts 52 also block passage of magnetic flux 42 through the structural webs 58 to redirect magnetic flux to cross the airgap 50 to the stator 30. A single layer of permanent magnets 48 is shown arranged within the rotor 36 in FIGS. 2-5, but additional layers of permanent magnets are also envisioned, such as shown in FIG. 6.

As shown in FIG. 5, the material of inserts 52 may be grain-oriented austenitic steel. Orientation of the grain in such insert material may be specifically selected to be perpendicular to direction of leakage of the magnetic flux 42 between the rotor 36 and stator 30. Such orientation of the material grain would also align parallel to direction of linkage of the magnetic flux between adjacent magnetic poles 40 and thereby redistribute and close the magnetic flux loop 42A among the corresponding permanent magnets 48. The rotor core 38 may include multiple adjacent rotor laminations 60 arranged in a stack along the rotational axis X, with each lamination having a corresponding set of inserts 52. As noted above, dielectric separators may be installed between insert segments 52 embedded in adjacent laminations to minimize the impact of induced eddy currents. The rotor laminations 60 may be constrained or fixed together by an interference fit with the rotor core or by being pressed together via rotor end plates (not shown).

With resumed reference to FIG. 2, the inserts 52 of adjacent rotor laminations 60 may be arranged out of phase, i.e., strategically phase-angle shifted or misaligned, relative to one another. As result, the magnetic poles 40 and the inserts 52 of rotor laminations 60 would also be shifted along the rotational axis X and therefore out of phase relative to the magnetic poles and inserts on their immediately adjacent, i.e., neighboring, rotor laminations. Such a shifted arrangement of the adjacent rotor laminations 60 is intended to enhance efficient operation of the motor-generator 14 by reducing a slotting effect on the rotor 36 and stator 30 facing surfaces. Adjacent rotor laminations 60 may be electrically isolated from one another via respective dielectric elements 62, such as thin strips of dielectric material or a dielectric coating applied therebetween.

The material of inserts 52 may have relatively low magnetic permeability in a particular geometric direction. For example, each insert 52 may define a radial magnetic permeability 64A and a circumferential magnetic permeability 64B relative to the rotational axis X. Furthermore, magnetic permeability of each insert 52 may be dissimilar in the respective radial and circumferential directions. In other words, the magnitude of radial magnetic permeability 64A may be different from the magnitude of circumferential magnetic permeability 64B, which may be used to advantageously direct the flow of magnetic flux 42 inside the rotor 36. Overall, the relatively low magnetic permeability material inserts 52 block passage of magnetic flux 42 through rotor bridges and/or webs to limit flux leakage within the rotor, redirect magnetic flux, and control flux distribution across the rotor to promote flux crossing the airgap to the stator. Additionally, the inserts 52, being integrated into the rotor assembly, reinforce the rotor structure and retain the permanent magnets within the rotor core.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A radial flux electric motor comprising:
a stator having a radially inner stator surface and stator windings arranged thereon; and
a rotor mounted inside the stator and configured to rotate relative thereto about a rotational axis, wherein the rotor includes:
a rotor core constructed from a ferromagnetic material having relatively high magnetic permeability and defined by a rotor outer surface establishing an airgap between the rotor and the stator;
a plurality of magnetic poles set in the rotor core and configured to generate magnetic flux; and
inserts constructed from a material having relatively low magnetic permeability in at least one geometric direction, wherein each insert is mechanically fixed to the rotor core to thereby control magnetic flux distribution and minimize flux leakage inside the rotor, and each insert defines a radial magnetic permeability and a circumferential magnetic permeability relative to the rotational axis, and wherein magnitude of the radial magnetic permeability is different from magnitude of the circumferential magnetic permeability.

2. The radial flux electric motor according to claim 1, wherein each insert is arranged on the rotor outer surface either between adjacent magnetic poles or across from individual magnetic poles.

3. The radial flux electric motor according to claim 1, wherein each insert has one of a hollow body and a solid body construction.

4. The radial flux electric motor according to claim 1, wherein each magnetic pole includes at least one rotor pocket having at least one permanent magnet embedded therein and configured to generate the magnetic flux, and wherein each rotor pocket has at least a portion thereof arranged proximate to at least one of the inserts.

5. The radial flux electric motor according to claim 1, wherein each insert is configured to define a structural bridge extending from at least one of the rotor pockets to the rotor outer surface thereby reinforcing the rotor core and minimizing leakage of the magnetic flux inside the rotor.

6. The radial flux electric motor according to claim 5, wherein the insert material is grain-oriented steel, and wherein orientation of the grain is perpendicular to direction of leakage of the magnetic flux between the rotor and stator and parallel to direction of linkage of the magnetic flux between adjacent magnetic poles.

7. The radial flux electric motor according to claim 1, wherein each insert is configured to minimize closure of a magnetic flux loop inside the rotor.

8. The radial flux electric motor according to claim 1, wherein the rotor core includes multiple adjacent rotor laminations arranged along the rotational axis, and wherein the inserts of adjacent rotor laminations are arranged out of phase relative to one another.

9. The radial flux electric motor according to claim 8, wherein the adjacent rotor laminations are electrically isolated from one another via a dielectric element.

10. A motor vehicle comprising:
a radial flux electric motor configured to generate torque for propulsion of the motor vehicle, the radial flux electric motor including:
a stator having a radially inner stator surface and stator windings arranged thereon; and
a rotor mounted inside the stator and configured to rotate relative thereto about a rotational axis, wherein the rotor includes:
a rotor core constructed from a ferromagnetic material and defined by a rotor outer surface establishing an airgap between the rotor and the stator;
a plurality of magnetic poles set in the rotor core and configured to generate magnetic flux; and
inserts constructed from a material having relatively low magnetic permeability in at least one geometric direction, wherein each insert is mechanically fixed to the rotor core to thereby control magnetic flux distribution and minimize flux leakage inside the rotor, and each insert defines a radial magnetic permeability and a circumferential magnetic permeability relative to the rotational axis, and wherein magnitude of the radial magnetic permeability is different from magnitude of the circumferential magnetic permeability.

11. The motor vehicle according to claim 10, wherein each insert is arranged on the rotor outer surface either between adjacent magnetic poles or across from individual magnetic poles.

12. The motor vehicle according to claim 10, wherein each insert has one of a hollow body and a solid body construction and is configured to minimize closure of a magnetic flux loop inside the rotor.

13. The motor vehicle according to claim 10, wherein each magnetic pole includes at least one rotor pocket having at least one permanent magnet embedded therein and configured to generate the magnetic flux, and wherein each rotor pocket has at least a portion thereof arranged proximate to at least one of the inserts.

14. The motor vehicle according to claim 10, wherein each insert is configured to define a structural bridge extending from at least one of the rotor pockets to the rotor outer surface thereby reinforcing the rotor core and minimizing leakage of the magnetic flux inside the rotor.

15. The motor vehicle according to claim 14, wherein the insert material is grain-oriented steel, and wherein orientation of the grain is perpendicular to direction of leakage of the magnetic flux between the rotor and stator and parallel to direction of linkage of the magnetic flux between adjacent magnetic poles.

16. The motor vehicle according to claim 10, wherein the rotor core includes multiple adjacent rotor laminations arranged along the rotational axis, and wherein the inserts of adjacent rotor laminations are arranged out of phase with one another.

17. The motor vehicle according to claim 16, wherein the adjacent rotor laminations are electrically isolated from one another via a dielectric element.

18. A radial flux electric motor comprising:
a stator having a radially inner stator surface and stator windings arranged thereon; and
a rotor mounted inside the stator and configured to rotate relative thereto about a rotational axis, wherein the rotor includes:
a rotor core constructed from a ferromagnetic material having relatively high magnetic permeability and defined by a rotor outer surface establishing an airgap between the rotor and the stator, wherein:

the rotor core includes multiple adjacent rotor laminations arranged along the rotational axis; and the adjacent rotor laminations are electrically isolated from one another via a dielectric element;

a plurality of magnetic poles set in each of the adjacent rotor laminations and configured to generate magnetic flux; and inserts constructed from a material having relatively low magnetic permeability in at least one geometric direction, wherein:

each insert is mechanically fixed to the rotor core to thereby control magnetic flux distribution and minimize flux leakage inside the rotor;

each insert defines a radial magnetic permeability and a circumferential magnetic permeability relative to the rotational axis, and wherein magnitude of the radial magnetic permeability is different from magnitude of the circumferential magnetic permeability; and the inserts of adjacent rotor laminations are arranged out of phase with one another.

19. The radial flux electric motor according to claim 18, wherein each insert is configured to define a structural bridge extending from at least one of the rotor pockets to the rotor outer surface thereby reinforcing the rotor core and minimizing leakage of the magnetic flux inside the rotor.

20. The radial flux electric motor according to claim 19, wherein the insert material is grain-oriented steel, and wherein orientation of the grain is perpendicular to direction of leakage of the magnetic flux between the rotor and stator and parallel to direction of linkage of the magnetic flux between adjacent magnetic poles.

* * * * *